United States Patent [19]

Delomez

[11] 4,358,718
[45] Nov. 9, 1982

[54] CENTRALIZED ELECTRIC CONTROL DEVICE IN PARTICULAR FOR AUTOMOBILE VEHICLE LATCHES

[75] Inventor: Gerard Delomez, Evry, France

[73] Assignee: Compagnie Industrielle de Mecanismes en abrege C.I.M., Levallois Perret, France

[21] Appl. No.: 163,109

[22] Filed: Jun. 26, 1980

[30] Foreign Application Priority Data

Jul. 3, 1979 [FR] France .................... 79 17225

[51] Int. Cl.³ .................................. H02P 1/54
[52] U.S. Cl. ........................ 318/54; 318/65; 318/103; 318/112
[58] Field of Search .............. 318/49, 50, 51, 53, 318/54, 65, 77, 87, 34, 101, 103, 112, 444; 49/73, 77, 79, 81, 32; 70/237-239, 275, 277, 279

[56] References Cited

U.S. PATENT DOCUMENTS

| | | |
|---|---|---|
| 4,061,948 | 12/1977 | Lamparter .............. 318/112 X |
| 4,174,494 | 11/1979 | Pfeffer ........................ 318/54 |
| 4,203,039 | 5/1980 | Pritchard ................ 70/279 X |

Primary Examiner—Ulysses Weldon
Attorney, Agent, or Firm—Holman & Stern

[57] ABSTRACT

This control device permits commanding a group of reversible motor-driven actuating devices to effect the movement of one thereof when moved mechanically. It comprises a detection circuit which detects the presence and polarity of an electromotive force at the terminals of one of the motors, and delay circuits and power circuits which are piloted by the detection circuit so as to connect the motors to a supply source with the same polarity as the polarity of the detected electromotive force.

Application in the control of automobile vehicle latches.

14 Claims, 4 Drawing Figures

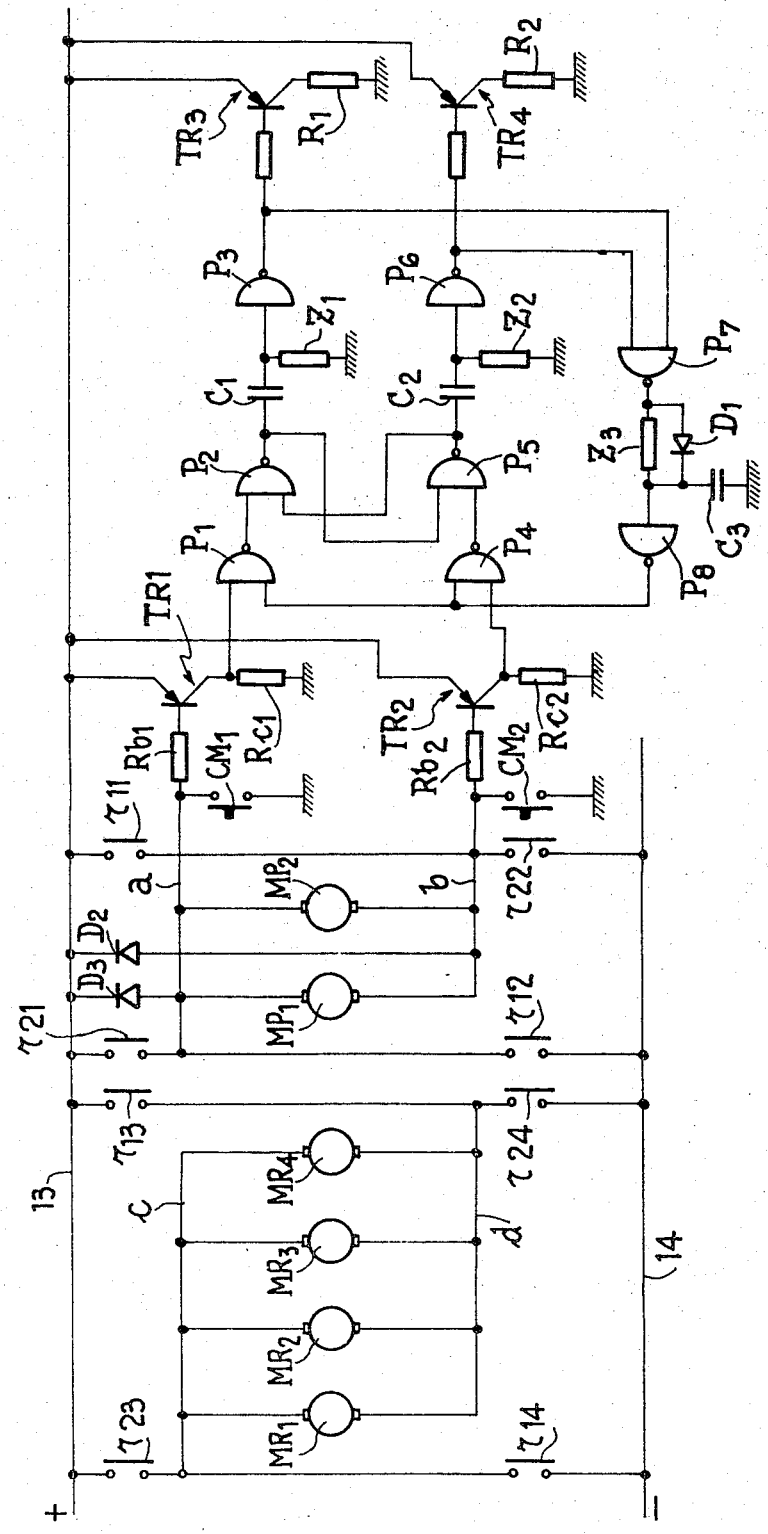

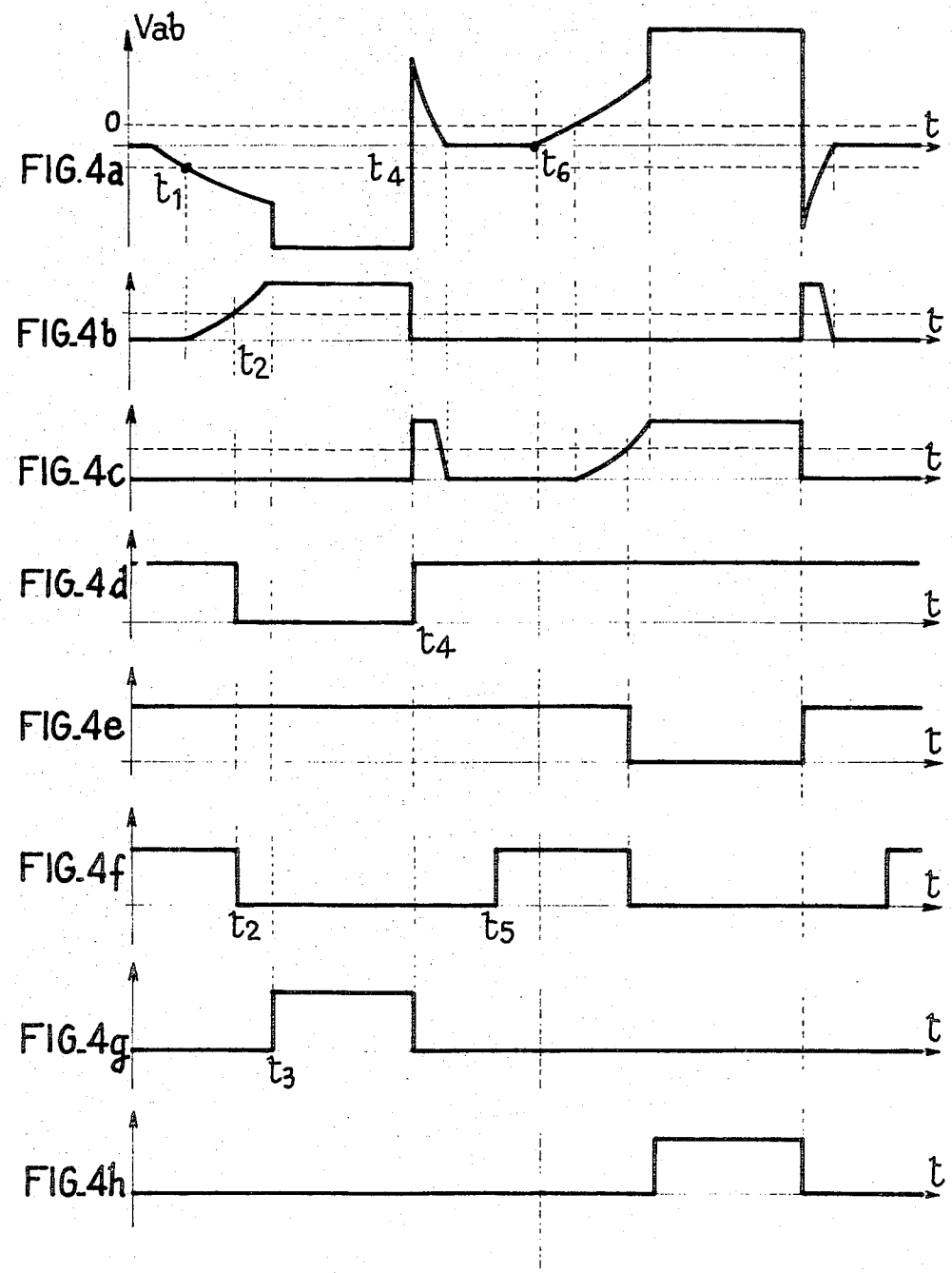

CENTRALIZED ELECTRIC CONTROL DEVICE IN PARTICULAR FOR AUTOMOBILE VEHICLE LATCHES

The present invention relates to a centralized electric control device for a group of reversible motor-driven actuating devices, in particular for automobile vehicle latches.

A reversible motor-driven actuating device is a device of the type which may be driven, either by its motor supplied with current from a dc supply, or mechanically, and which, when it is made to move mechanically, is the centre of an electromotive force the sign of which is a characteristic of the direction of movement of the actuating device. Such devices may consequently be employed for actuating mechanically or electrically latch locking levers of in particular automobile vehicles.

An object of the present invention is to provide an electric control device controlling a group of actuating devices of the aforementioned type which, in response to the movement of one thereof in one direction or the other, commands all of the actuating devices to effect a movement in the same direction as the device which had been moved mechanically.

Consequently, the invention provides an electric control device controlling a group of at least two actuating devices of the aforementioned type, which comprises a circuit for detecting the presence and the polarity of an electromotive force at the terminals of at least one of said motors, a first power circuit which, in response to the detection by the detection circuit of an electromotive force of a given polarity at the terminals of said motor, connects all of the motors to said supply source in accordance with said given polarity, and a second power circuit which, in response to the detection by the detection circuit of an electromotive force of opposite polarity at the terminals of said motor, connects all of said motors to the supply source in accordance with the opposite polarity.

According to a feature of the invention, said circuit comprises first and second delay circuits which are triggered in response to the detection of an electromotive force of said given polarity and of the opposite polarity respectively and respectively actuating said first and second power circuits during a period at least equal to that required by said actuating devices to pass from one to the other of their positions.

According to another feature of the invention, the device comprises a third delay circuit which is triggered in response to the detection of an electromotive force of one or other polarity for inhibiting the detection circuit during a period of time at least equal to that required for ensuring that the current in said motors is eliminated after the cutting off of their supply by one of said power circuits.

According to yet another feature of the invention, said detection circuit comprises a first and a second amplifier which are responsive to the signs of the voltage applied to their control electrode and are connected to the respective terminals of said motor, and a multivibrator circuit whose inputs are connected to the outputs of said amplifiers and of the third delay circuit.

Further features and advantages of the invention will be apparent from the ensuing description of one embodiment thereof illustrated by the accompanying drawings, in which:

FIG. 3 is an electric circuit diagram of a specific embodiment of the control device according to the invention, and, FIGS. 4a to 4h constitute a chronogram showing the shape of the voltage at different points of the circuit of FIG. 3.

Figure 1:
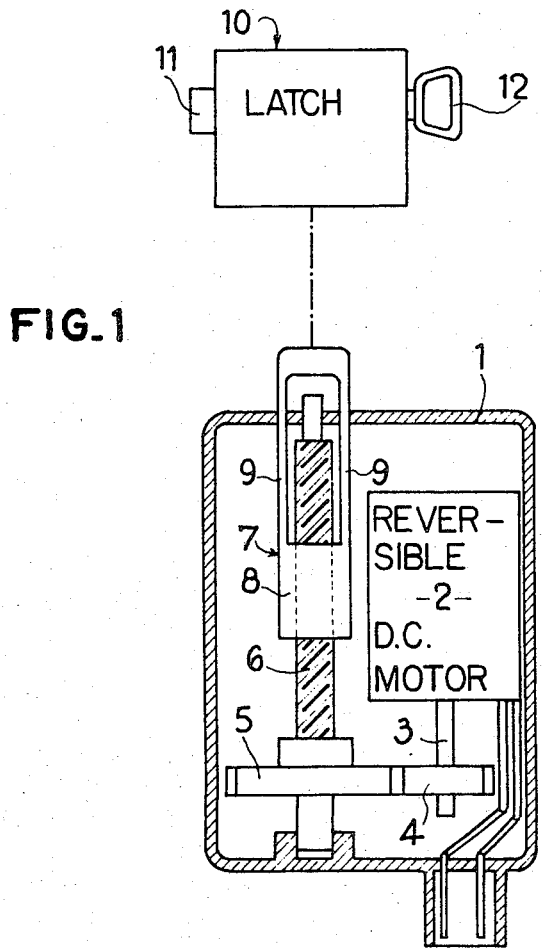
FIG. 1 is a longitudinal diagrammatic sectional view of a reversible motor-driven actuating device associated with a latch mechanism.

Reference will be made first of all to FIG. 1 which shows an embodiment of a reversible motor-driven actuating device which may be employed with the control device according to the invention. This actuating device comprises a case 1 in which is disposed a dc electric motor 2 whose shaft 3 carries a gear wheel 4 which engages a gear wheel 5 connected to rotate with a reversible screw 6 which is rotatively mounted in the case 1. The screw 6 carries a carriage 7 having a part 8 forming a nut screwthreadedly engaged with the screw 6 and two arms 9 which extend out of the case through slots formed in the latter. The carriage 7 is connected by suitable mechanical connecting means to a latch mechanism 10 having a bolt 11 and a manual actuating member 12, shown in the form of a ring in the drawing but which may be formed by any suitable means such as a key or window frame pull-member etc . . . . The dc motor 2 is a reversible motor so that it can rotate in one direction or the other, depending on whether a voltage of a given polarity or of the opposite polarity is applied thereto. Depending on the direction of rotation imparted thereto by the motor 2, the screw 6 drives the carriage 7 in translation in one direction or the other so as to lock or unlock the latch 10. Likewise, the mechanical locking and unlocking operations of the latch 10 effected by the member 12 cause the carriage 7 to move in opposite directions. When it is thus driven by this mechanical operation of the latch 10, the nut 7 rotates the screw 6 and consequently the rotor of the motor 2. The latter is then the centre of an electromotive force whose polarity is a characteristic of the direction of displacement of the carriage 7.

It must of course by understood that the reversible motor-driven actuating device described hereinbefore is given merely by way of an illustrative example and it may be constructed in many other ways. In particular, the screw-nut system may be replaced by a rack and pinion system. Further, it will be observed that such a device may be employed for actuating any means which is movable between two positions, even if a preferred application of the invention resides in the control of automobile vehicle latches.

Reference will now be made to the block diagram of FIG. 2 which illustrates the control device according to the invention. This control device comprises a detection circuit for detecting the presence and the polarity of an electromotive force at the terminals of a group of motors M of reversible devices of the type defined in the preamble of the present description. This detection circuit comprises amplifiers $A_1$ and $A_2$ whose input is responsive to the polarity of the voltage applied thereto. The outputs of the amplifiers are applied to the inputs of a multivibrator circuit B whose two outputs are connected respectively to first and second delay circuits. The first delay circuit $T_1$ pilots a first power circuit comprising an amplifier $A_3$ and a relay $R_1$ whereas the second delay circuit $T_2$ pilots a second power circuit comprising an amplifier $A_4$ and a relay $R_2$. The relays $R_1$ and $R_2$ control a supply circuit S of the group of motors M in such manner as to supply power to the latter with a polarity which is identical to that which had been detected by the detection circuit. The control circuit is completed by a third delay circuit $T_3$ controlled by the delay circuits $T_1$ and $T_2$ so as to inhibit the detection circuit by means of inhibiting elements $IN_1$ and $IN_2$.

The circuit described hereinbefore operates in the following manner:

The electromotive force produced by one of the motors of the group M in response to the mechanical actuation of one of the corresponding actuating devices is amplified in accordance with its direction by one or the other of the amplifiers $A_1$ and $A_2$. Beyond a threshold, the output signal of one of these two amplifiers actuates the multivibrator circuit B which triggers one or the other of the delay circuits $T_1$ and $T_2$, depending on the polarity of the detected electromotive force. The triggered delay pilots the associated amplifier and relay which control the supply circuit S so as to apply to the group of motors M a voltage of the same polarity as that of the detected electromotive force. Further, in response to the detection of this electromotive force, one or the other of the delay circuits $T_1$ and $T_2$ controls the third delay circuit $T_3$ which acts on the input of the multivibrator circuit B so as to inhibit the latter for a period of time which is at least equal to that required to ensure that the current in the motors M is eliminated after the cutting off of their supply by one or the other of the relays $R_1$ and $R_2$. This inhibition of the multivibrator circuit is necessary upon the cutting off of the supply of the motors which occurs when that one of the delay circuits $T_1$ and $T_2$ which had been triggered returns to rest. Indeed, there then appears a self-induction electromotive force of a sign opposite to the voltage just cut off the effect of which would be, in the absence of the inhibition of the multivibrator circuit, to trigger the other path of the multivibrator circuit.

Reference will now be made to FIG. 3 which shows a circuit which conforms to the block diagram of FIG. 2. In this embodiment, the group of motors M comprises a motor group $MR_1$, $MR_2$, $MR_3$ and $MR_4$, hereinafter termed "receiver" motors, and another group of two motors $MP_1$ and $MP_2$ hereinafter termed "pilot" motors. The "receiver" motors are the motors of reversible actuating devices which may be operated electrically or mechanically but which, in the latter case, must not cause the energization of the other motors of the two groups. On the other hand, the "pilot" motors are motors belonging to reversible actuating devices which, when they are operated mechanically, must cause the energization of all the other motors, whether they be "pilot" or "receiver" motors. The "pilot" motors $MP_1$ and $MP_2$ are connected in parallel to a conductor a by one of their terminals and to a conductor b by the other terminals. Likewise, the "receiver" motors $MR_1$, $MR_2$, $MR_3$ and $MR_4$ are connected in parallel between conductors c and d.

The conductor a is connected to the base of a transistor $TR_1$ corresponding to the amplifier $A_1$ through a resistor $R_{b1}$. The output of the transistor $TR_1$, taken between its collector and its load resistor $R_{c1}$, is applied to one of the two inputs of a NAND gate $P_1$ whose output is connected to one of the two inputs of another NAND gate $P_2$ whose output is connected to an inverter $P_3$ through a capacitor $C_1$ and a resistor $Z_1$ connected between ground and the connection between the capacitor $C_1$ and the inverter $P_3$.

Likewise, the conductor b is connected to the base of a transistor $TR_2$ corresponding to the amplifier $A_2$ through a resistor $R_{b2}$. The transistor $TR_2$ also has a load resistor $R_{c2}$ and its emitter, as the emitter of the transistor $TR_1$, is connected through a conductor 13 to the positive terminal of a dc supply source (not shown) whose negative terminal is connected to a conductor 14. The output of the transistor $TR_2$ is connected to one of the two inputs of a NAND gate $P_4$ whose output is connected to one of the two inputs of a NAND gate $P_5$. The output of the gate $P_5$ is connected to an inverter $P_6$ through a capacitor $C_2$, and a resistor $Z_2$ is connected between $C_2$ and $P_6$ on one hand and ground on the other.

Figure 2:
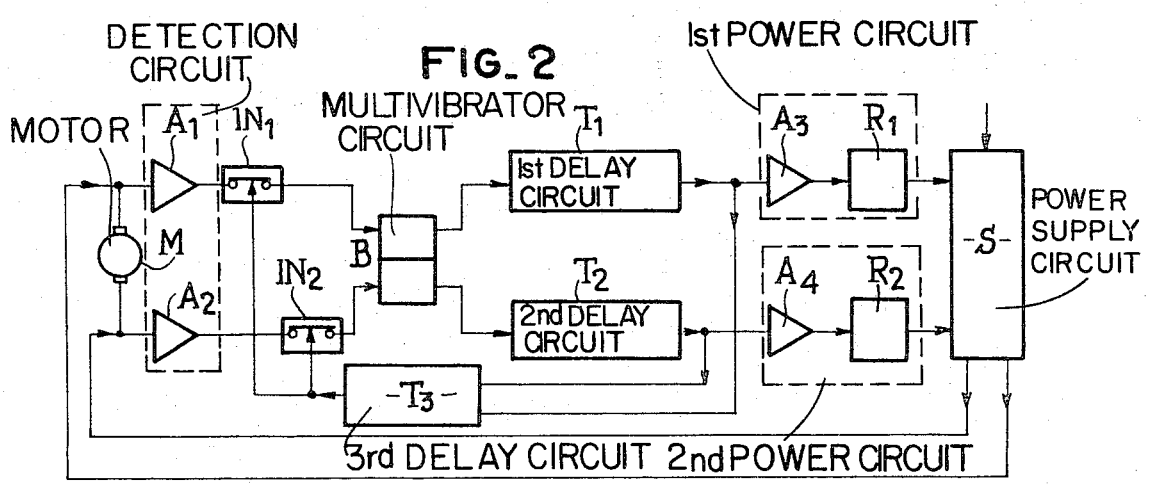
FIG. 2 is a block diagram of an electric control device according to the invention.

The output of the gate $P_5$ is connected to the other input of the gate $P_2$ and the output of the gate $P_2$ is connected to the other input of the gate $P_5$ so that these two gates together form an RS multivibrator constituting the multivibrator circuit B of FIG. 2.

Further, the other inputs of the gates $P_1$ and $P_2$ are connected to the output of the delay circuit $T_3$ so that these gates $P_1$ and $P_2$ constitute the elements which, depending on the state of the delay circuit $T_3$, inhibit or enable the gates $P_2$ and $P_5$. The delay circuit $T_3$ comprises a NAND gate $P_7$ whose two inputs are respectively connected to the outputs of the inverters $P_3$ and $P_6$ and whose output is connected to the input of an inverter $P_8$ through a resistor $Z_3$ connected in parallel with a diode $D_1$. The circuit $T_3$ is completed by a capacitor $C_3$ connected between ground and the connection between the resistor $Z_3$ and the inverter $P_8$ whose output constitutes the output of the delay circuit $T_3$.

The output of the delay circuit or monostable $T_1$, formed by the gate $P_3$, the capacitor $C_1$ and the resistor $Z_1$, is applied to the base of a transistor $TR_3$ constituting the amplifier $A_3$ and whose collector is loaded by the energizing winding of the relay $R_1$. Likewise, the output of the delay circuit or monostable $T_2$, constituted by the gate $P_6$, the capacitor $C_2$ and the resistor $Z_2$, is connected to the base of a transistor $TR_4$ constituting the amplifier $A_4$ and whose collector is loaded by the energizing winding of the relay $R_2$.

The relay $R_1$ controls four moving contacts, namely a contact $r_{11}$ connected between the conductor b and the conductor 13, a moving contact $r_{12}$ connected between the conductor a and the conductor 14, a moving contact $r_{13}$ connected between the conductor d and the conductor 13 and a moving contact $r_{14}$ connected between the conductor c and the conductor 14. In the same way, the relay $R_2$ controls a moving contact $r_{21}$ connected between the conductor a and the conductor 13, a contact $r_{22}$ connected between the conductor a and the conductor 14, a moving contact $r_{23}$ connected between the conductor c and the conductor 13 and a moving contact $r_{24}$ connected between the conductor d and the conductor 14.

The circuit of FIG. 3 further comprises two diodes $D_2$ and $D_3$ of which one is connected between the conductor a and the conductor 13 and the other between the conductor b and the conductor 13. There are provided two manual control contacts $CM_1$ and $CM_2$, the first of which is connected between the conductor a and ground whereas the second is connected between the conductor b and ground so as to permit electrically controlling the group of motors without manual operation of one of the actuating devices having a "pilot" motor.

The operation of the circuit of FIG. 3 will be explained with reference also to FIGS. 4a to 4h. When one of the actuating devices associated with the pilot motors $MP_1$ and $MP_2$ is operated mechanically, the corresponding motor operates as a generator and develops an electromotive force $V_{ab}$ (FIG. 4a). At time $t_1$, when this electromotive force has reached a sufficient threshold value, it renders conductive one or the other of the transistors $TR_1$ and $TR_2$, depending on its polarity. For reasons of simplicity, it will be assumed hereinafter that it is the transistor $TR_1$ which has been rendered conductive, bearing in mind that the operation would be identical if it concerned transistor $TR_2$.

At rest, before the conduction of transistor $TR_1$, the transistors $TR_1$ and $TR_2$ are off and the inputs of gates $P_1$ and $P_4$ respectively connected to resistors $Rc_1$ and $Rc_2$ are at 0. The inputs of gates $P_1$ and $P_4$ connected to the output of inverter $P_8$ are at 1.

The output of inverter $P_8$ is at 1 since its input is at 0 for the following reason.

The outputs of inverters $P_3$ and $P_6$ are at 1 at the end of the delay introduced by the circuits $T_1$ or $T_2$ (FIG. 4d). The inputs of gate $P_7$ are at 1 and its output and consequently the input of inverter $P_8$ are at 0 after the discharge of the capacitor $C_3$ through the resistor $Z_3$.

The inputs of gates $P_1$ and $P_4$ being respectively at 0, 1, their outputs are both at 1.

Accordingly the corresponding inputs of gates $P_2$ and $P_5$ which form the multivibrator B are at 1.

It is assumed that before transistor $TR_1$ is rendered at first conductive the state of multivibrator B at rest is such that the output of gate $P_2$ is 0 and the output of gate $P_5$ is 1. FIGS. 4d and 4c show that at time $T_2$ the states of inverters $P_3$ and $P_6$ are both at 1. The input of inverter $P_3$ is at 0 since the output of gate $P_2$ is at 0 and capacitor $C_1$ is discharged. The input of inverter $P_6$ is also at 0 since capacitor $C_2$ was previously charged through resistor $Z_2$.

At conduction of transistor $TR_1$, a current flows between the emitter and the base of the transistor $TR_1$, the circuit of this transistor being closed through one of the diodes $D_2$ and $D_3$. A voltage appears at the terminals of the resistor $R_{c1}$ (FIG. 4b) and this voltage is applied to the gate $P_1$. When, at time $t_2$, this voltage reaches a sufficient threshold value, the gate $P_1$ is enabled owing to the fact that the delay circuit $T_3$ is not triggered and the RS multivibrator circuit $P_2$, $P_5$ triggers the delay circuit $T_1$ which produces at the output of the inverter $P_3$ the rectangular pulse shown in FIG. 4d. This renders the transistor $TR_3$ conductive and, after the voltage at the terminals of the energizing winding of the relay $R_1$ has reached a sufficient value, at time $t_3$, the relay $R_1$ closes the moving contacts $r_{11}$ and $r_{12}$ which supplies current to the "pilot" motors $MP_1$ and $MP_2$ with the same polarity as that of the electromotive force which had initiated the procedure, and the moving contacts $r_{13}$ and $r_{14}$, which supplies current to the "receiver" motors $MR_1$, $MR_2$, $MR_3$ and $MR_4$ also with the same polarity.

At time $t_4$, the delay circuit $T_1$ returns to rest (FIG. 4d), which blocks the transistor $TR_3$ so that the relay $R_1$ is no longer energized and the supply to all the motors is cut off. There then occurs an inversion of polarity at the terminals of these motors which causes the conduction of transistor $TR_2$ and the delivery of a control signal at one of the inputs of the gate $P_4$ (FIG. 4c).

However, the delay circuit $T_3$, which had been triggered at time $t_2$ by the delay circuit $T_1$, has a time constant exceeding that of the delay circuits $T_1$ and $T_2$ so that the gate $P_4$ is inhibited as long as a control voltage is applied by the transistor $TR_2$ to the gate $P_4$. The delay circuit $T_3$ thereafter returns to its position of rest at time $t_5$ (FIG. 4f) which is calculated in such manner that there is no longer any current in the "pilot" motors and the transistor $TR_2$ is blocked. The cycle of operation of the control circuit has then terminated and the actuating devices have effected a complete travel.

If, subsequently, one of the devices associated with a "pilot" motor is actuated mechanically in the other direction, it is the other transistor $TR_2$ which is rendered conductive and a new cycle of operation occurs as from time $t_6$, as shown in FIGS. 4a to 4h. However, this operation will not be described in detail since it is merely the reverse of that which has just been described, the operation of the relay $R_2$ being illustrated by FIG. 4h.

Note that without mechanical operation of the actuating devices associated with the "pilot" motors, it is possible to cause the rotation of the motors in one direction or the other by acting on one or the other of the manual contacts $CM_1$ and $CM_2$, the operation of the circuit being then identical to that just described.

The control device according to the invention has the advantage of requiring no detection by a position sensor in the region of the mechanicam of the actuating device, which considerably simplifies the system. Further, it limits the wiring between the control device and the actuating devices to merely the power conductors. Another advantage resides in the fact that the motors, which have a low impedance, are connected in parallel to the input of the circuit so that the latter is greatly immunized from parasites. The use of a logic system allows moreover the adoption of a CMOS technology having a low consumption of energy. The configuration of the circuit permits, by direct action on the multivibrator circuit, the use of any other control system such as the manual control contacts $CM_1$ and $CM_2$ or inertia switches for example.

Having now described the invention what I claim as new and desire to secure by Letters Patent is:

1. An electric control device for controlling a group of at least two reversible motor-driven actuating devices, in particular for automobile vehicle latches, in which each actuating device may be operated, selectively by its motor supplied with dc current from a supply source and mechanically, in opposite directions between two positions and is the region of electromotive forces having opposite polarities when it is operated mechanically respectively in one direction and in the other, said control device comprising, connected in a general circuit, a detection circuit having two inputs respectively connected to the terminals of at least one of said motors and two outputs which respectively deliver signals representing the detected presence and the respective polarity of an electromotive force at said terminals of said at least one motor, a first power circuit connected to a first of said outputs of the detection circuit and operative, in response to the detection by the detection circuit of an electromotive force of a given polarity at said terminals of said at least one motor, to connect all the motors to said supply source in accordance with said given polarity, and a second power circuit connected to a second of said outputs of the detection circuit and operative, in response to the detection by the detection circuit of an electromotive force of opposite polarity to said given polarity at said terminals of said at least one motor, to connect all said motors to said supply source in accordance with said opposite polarity.

2. A device as claimed in claim 1, comprising in said general circuit a first delay circuit and a second delay circuit which are triggered in response to the detection of an electromotive force of said given polarity and of said opposite polarity respectively and respectively controlling said first and second power circuits for a period of time which is at least equal to that required by said actuating devices for passing from one to the other of their positions.

3. A device as claimed in claim 1, comprising a third delay circuit which is connected to the detection circuit and triggered in response to the detection of an electromotive force of either polarity so as to inhibit the detection circuit during a period of time equal to at least that required to ensure that the current in said motors is eliminated after the cutting off of their supply by one of said power circuits.

4. A device as claimed in claim 3, wherein said detection circuit comprises a first amplifier and a second amplifier which are responsive to the sign of the voltage applied to control electrodes thereof and are connected to respective terminals of said motor, and a multivibrator circuit having inputs connected to outputs of said amplifiers and to an output of the third delay circuit.

5. A device as claimed in any one of the claims 1 to 4, wherein the first and second power circuits each comprise an amplifier and a relay connected to the amplifier, one of the relays having moving contacts which are adapted to connect a first terminal of the motors to a positive terminal of the supply source and a second terminal of the motors to a negative terminal of the supply source, the other relay having moving contacts which are adapted to connect the first terminal of the motors to the negative terminal of the source and said second terminal of the motors to the positive terminal of the source.

6. A device as claimed in claim 4, wherein said amplifiers are constituted by transistors.

7. A device as claimed in claim 5, wherein said amplifiers are constituted by transistors.

8. A device as claimed in claim 4, wherein said multivibrator circuit is an RS multivibrator circuit.

9. A device as claimed in claim 8, comprising two validation-inhibition gates, each validation-inhibition gate having two inputs and an output and one input connected to a respective one of the amplifiers of the detection circuit and its output connected to the respective input of the RS multivibrator circuit, the second input of each validation-inhibition gate being connected to an output of the third delay circuit.

10. A device as claimed in claim 6, 8 or 9, wherein a secondary control switch is connected to the input of each amplifier of the detection circuit so as to control the excitation of said amplifiers.

11. A device as claimed in claim 3, comprising in said general circuit a first delay circuit and a second delay circuit which are triggered in response to the detection of an electromotive force of said given polarity and of said opposite polarity respectively and respectively controlling said first and second power circuits for a period of time which is at least equal to that required by said actuating devices for passing from one to the other of their positions, the third delay circuit comprising two inputs which are respectively connected to outputs of the first and second delay circuits.

12. A device as claimed in claim 2, wherein said delay circuits are constituted by monostable multivibrators.

13. A device as claimed in claim 1, 2, 3 or 4, wherein said group of motors comprises a first group of motors connected in parallel, the detection circuit being connected to terminals of said first group of motors, and a second group of motors which are disassociated from the detection circuit.

14. A device as claimed in claim 7, wherein a secondary control switch is connected to the input of each amplifier of the detection circuit so as to control the excitation of said amplifiers.

* * * * *